(12) United States Patent  (10) Patent No.: US 6,612,795 B2
Kirchen  (45) Date of Patent: Sep. 2, 2003

(54) QUARTER TURN PANEL FASTENER

(75) Inventor: James T. Kirchen, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/966,431

(22) Filed: Sep. 26, 2001

(65) Prior Publication Data

US 2003/0059255 A1 Mar. 27, 2003

(51) Int. Cl.$^7$ ............................................. F16B 19/00
(52) U.S. Cl. ..................... 411/508; 411/553; 411/509; 411/913; 24/297
(58) Field of Search .................. 403/350–353, 403/315–317, 326–329, 348; 24/297; 411/553, 552, 551, 508, 509, 913

(56) References Cited

U.S. PATENT DOCUMENTS

| | | |
|---|---|---|
| 2,258,668 A | 10/1941 | Zahodiakin |
| 3,123,389 A | 3/1964 | Biesecker |
| 3,550,217 A | 12/1970 | Collyer |
| 3,675,531 A | 7/1972 | Lehman |
| 3,745,612 A | 7/1973 | Seckerson |
| 3,764,729 A | 10/1973 | Kowalewski |
| 3,811,154 A | 5/1974 | Lindeman et al. |
| 3,811,157 A | 5/1974 | Schenk |
| 3,986,780 A | 10/1976 | Nivet |
| 4,007,516 A | 2/1977 | Coules |
| 4,047,266 A | 9/1977 | Bisbing |
| 4,137,610 A | 2/1979 | Hoen |
| 4,213,230 A | 7/1980 | Hoen |
| 4,422,222 A | 12/1983 | Notoya |
| 4,506,419 A | 3/1985 | Mitomi |
| 4,629,356 A | 12/1986 | Hayashi |
| 4,652,192 A | 3/1987 | Schaller |
| 4,728,238 A | 3/1988 | Chisholm et al. |
| 4,762,437 A | 8/1988 | Mitomi |
| 4,781,488 A | 11/1988 | Hayashi |
| 4,810,147 A | 3/1989 | Hirohata |
| 4,981,405 A | 1/1991 | Kato |
| 4,987,656 A | 1/1991 | Sato |
| 5,011,356 A | 4/1991 | Fernandez |
| 5,173,026 A | 12/1992 | Cordola et al. |
| D357,176 S | 4/1995 | Ernest et al. |
| 5,507,610 A * | 4/1996 | Benedetti et al. ........... 411/339 |
| 5,570,984 A | 11/1996 | Reznikov et al. |
| 5,695,307 A | 12/1997 | Takahashi |
| 5,797,714 A | 8/1998 | Oddenino |
| 6,042,296 A | 3/2000 | Wittig et al. |

* cited by examiner

Primary Examiner—Lynne H. Browne
Assistant Examiner—G. M. Collins
(74) Attorney, Agent, or Firm—Pitney, Hardin, Kipp & Szuch LLP

(57) ABSTRACT

The fastener includes a head with an oval-shaped base. The head is supported by a cylindrical post and includes overhanging or cantilevered portions along the major axis of the oval-shaped base. These overhanging portions are ramped and face a first seal. The head engages a slot in a panel by first being inserted therethrough and then being twisted by one quarter turn so that the edges of the slot are engaged between the first seal and the cantilevered portions. Flex tabs lock the head in place. The fastener further includes a cylindrical retainer with flexible retaining fingers which is inserted by a linear motion into an aperture in another panel, thereby engaging the panel between the retaining fingers and the second seal.

20 Claims, 2 Drawing Sheets

QUARTER TURN PANEL FASTENER

BACKGROUND OF THE INVENTION

1. Field of the Invention

This invention relates to fasteners, particularly for adjacent panels of sheet metal, which can be fastened with relatively small ranges of rotation, particularly one quarter turn to a first panel, and linearly inserted into a second adjacent panel.

2. Description of the Prior Art

In the prior art, reusable fasteners are used in many applications wherein adjacent sheet metal panels are joined, such as, but not limited to, automotive applications. However, many of these fasteners function only if the aperture in the panel is a molded aperture having intricate ramped surfaces. Additionally, many fasteners in the prior art do not provide a seal on the panel. Other prior art of this type includes multi-component fasteners which increase the difficulty during assembly or disassembly, both in automated and manual applications.

SUMMARY OF THE INVENTION

The invention is a fastener which passes through aligned apertures of adjacent panels of sheet metal. The fastener includes a head and a retainer. The head includes ramped surfaces on the underside thereof and an oval quarter turn configuration which is designed to install through a slot in a flat panel, typically the secondary panel. Flex tabs lock the head in place after the head has been turned one quarter turn.

The retainer includes retention fingers, which can be of a single or a double height, for engaging a flat panel, typically a primary panel. The fastener further provides seals against the panels, which is particularly important in automotive applications. Additionally, a foam or rubber washer can enhance the sealing.

The fastener of the present invention is further easily serviceable in that the fastener can be turned one quarter turn in the opposite direction of the original installation, so that the secondary panel can be removed from the primary panel, but the fastener remains attached to the primary panel by the retention fingers.

DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
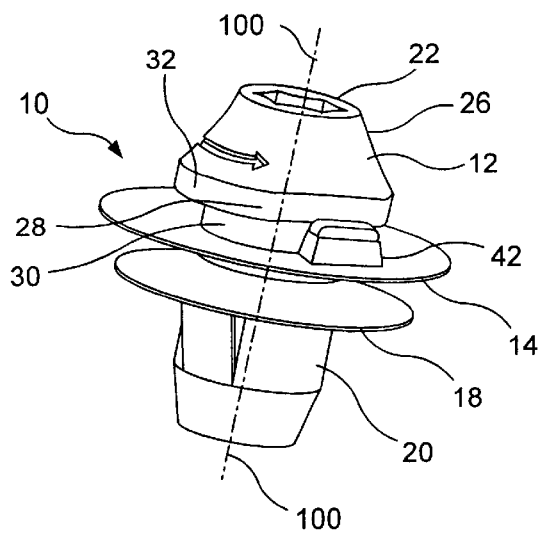
FIG. 1 is a side perspective view of the fastener of the present invention.
Figure 4:
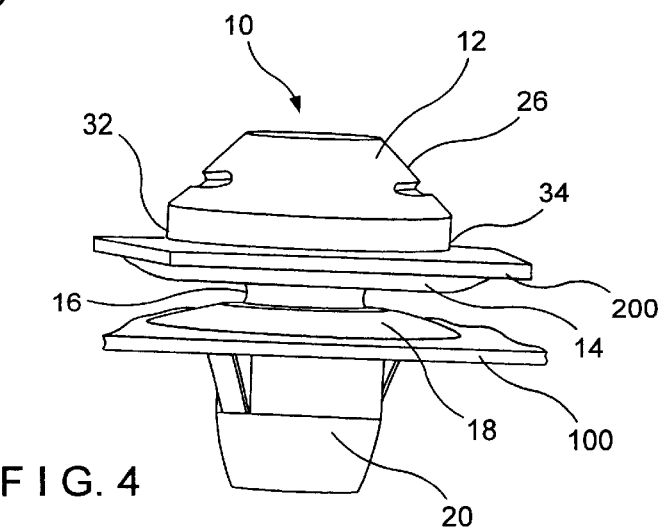
FIG. 4 is a side plan view of the fastener of the present invention, shown with installed to the primary and secondary panels.

Referring now to the drawings in detail wherein like numerals indicate like elements throughout the several views, one sees that FIG. 1 is a perspective view of the fastener 10 of the present invention. Fastener 10 is typically formed of an integral piece of molded plastic, although those skilled in the art will recognize a range of equivalent substitutions. Fastener 10 is formed about a longitudinal axis 100 and includes the following parts, starting from the top in the orientation shown in FIG. 1—oval shaped head 12, head seal 14, spacer 16 (shown in FIG. 4), retainer seal 18 and retainer 20.

Head 12 has a circular upper surface 22 with a blind aperture 24 with alternating concave and convex interior surfaces for receiving a driving tool (not shown) along longitudinal axis 100. Frusto-conical walls 26 extend downwardly from circular upper surface 22 to oval-shaped base 28. Oval-shaped base 28 is supported by a cylindrical post 30 which has a diameter substantially coextensive with the minor axis of oval-shaped base 28. Cantilevered underside portions 32, 34 of oval shaped base 28 are formed along the exterior portions of major axis of oval shaped base 28. In the illustrated embodiment, cantilevered underside portions 32, 34 extend radially outward from cylindrical support 30 by a distance equal to one half of the difference between the length of the major axis and the length of the minor axis of oval-shaped base 28. However, those skilled in the art will recognize that other configurations of the major and minor axis may be used according to the present invention. Cantilevered underside portions 32, 34 are ramped. This ramped configuration allows a range of thicknesses of secondary panel 200 to be engaged between cantilevered underside portions 32, 34 and head seal 14.

Head seal 14 has a disk-shaped cross section when viewed from above in the orientation of FIG. 1 or along longitudinal axis 100. Head seal 14 further has an upwardly directed umbrella-type shape so as to flatten and compress against a panel engaged between head seal 14 and cantilevered underside portions 32, 34 of head 12 thereby forming a sealing relationship.

Locking tabs 40, 42 (see FIG. 9 for the illustration of both tabs 40, 42) are formed at the intersection of circular support 30 and head seal 14, immediately under the minor axis of oval shaped base 28 of head 12. Locking tabs 40, 42 are typically as long as the width of the slot into which head 12 will lock. Further, locking tabs 40, 42 are configured and arranged to bend downwardly when head 12 is first inserted in an oval slot 202 of secondary panel 200 such as in FIG. 8, and then after head 12 is turned a quarter turn (i.e., 90°), locking tabs 40, 42 snap upwardly so as to traverse a width of oval slot 202 thereby locking fastener 10 in place with respect to slot 202.

Figure 2:
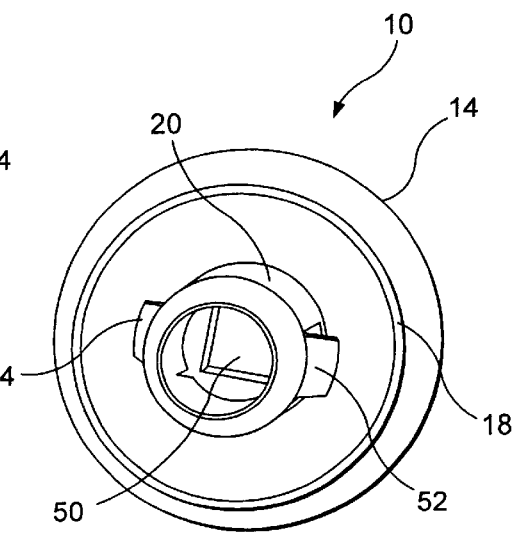
FIG. 2 is a bottom perspective view of the fastener of the present invention.
Figure 3:
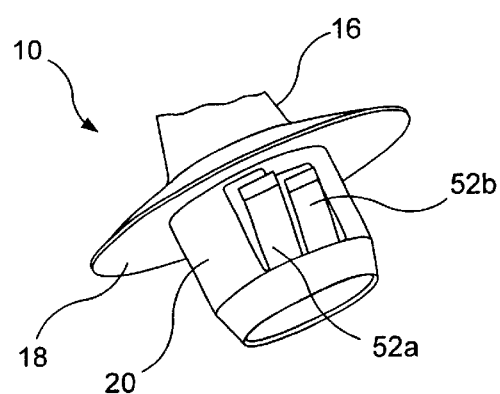
FIG. 3 is a perspective view of the fastener of the present invention, particularly illustrating the retainer portion.

Spacer 16 separates head seal 14 from retainer seal 18. Retainer seal 18 is similarly shaped to head seal 14 in that it is disk-shaped when viewed along the longitudinal axis 100 and further has an umbrella-type shape when viewed from the side, directed toward retainer 20. Retainer seal 18 flattens and compresses thereby forming a sealing relationship with a primary panel 100 engaged by retainer 20. Retainer 20 is illustrated as being cylindrically shaped and, as shown in FIG. 2, has a hollow interior with a square or other shaped blind aperture 50 therein for receiving a driving tool (not shown). Those skilled in the art will realize that other configurations of the retainer 20, including but not limited to a tree-type design, can be used according to the principles of the present invention. Lateral walls of retainer 20 include diametrically opposed retention fingers 52, 54 pointing upwardly toward retainer seal 18. FIG. 2 shows single level retention fingers 52, 54 for snap engaging a primary panel 100 of a specific thickness or narrow range of thicknesses between retention fingers 52, 54 and retainer seal 18. However, FIG. 3 shows a double level retention finger 52a, 52b allowing for a broader range of thicknesses of primary panel 100 to be engaged therein. The cylindrical shape of retainer 20 allows retainer 20 to rotate within the aperture of primary panel 100 while snap detent engaged therein.

Figure 5:
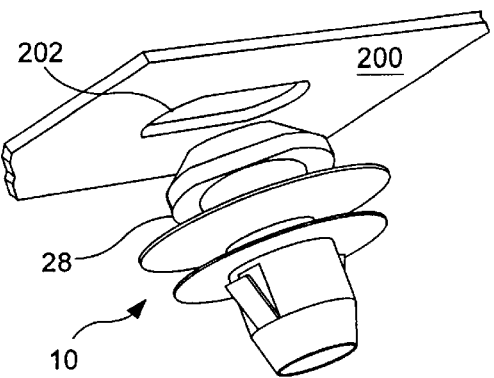
FIG. 5 is a perspective view of the head of the fastener of the present invention being inserted through an oval shaped slot.
Figure 7:
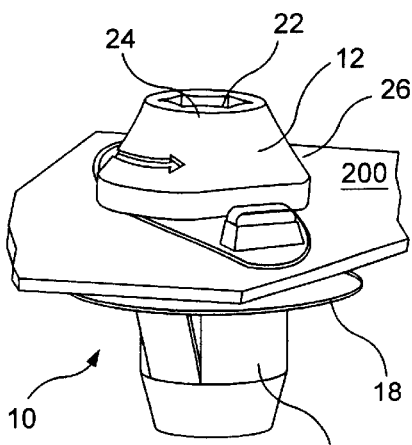
FIG. 7 is a perspective view of the fastener of the panel of FIG. 5.
Figure 6:
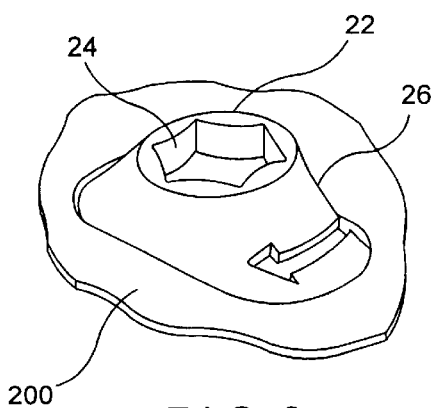
FIG. 6 is a perspective view of the fastener of the present invention with the head fastened to the panel of FIG. 5.
Figure 8:
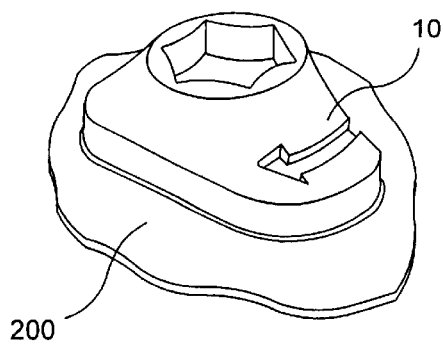
FIG. 8 is a top perspective view of the head of the fastener of the present invention being inserted through the oval shaped slot in the panel of FIG. 5.
Figure 9:
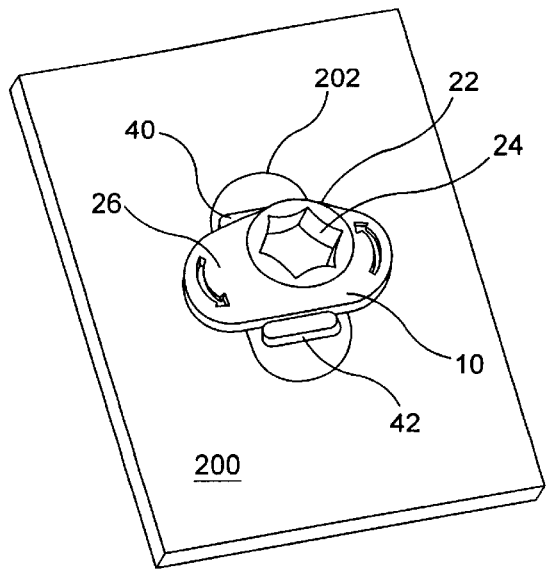
FIG. 9 is a top perspective view of the head of the fastener of the present invention in an installed position in the oval shaped slot in the panel.

To use the fastener 10 of the present invention, the user typically inserts head 12 into an oval slot 202 in a secondary panel 200 (a typical but non-limiting example of a secondary panel 200 is a panel of an automotive door module) as shown in FIGS. 5 and 8. This initially requires the major axis of oval shaped base 28 to be aligned with the length of oval slot 202. The user then twists fastener 10, possibly with the aid of driving tools inserted into at least one of blind apertures 24, 50, by one quarter turn (i.e., 90°) so that the edges of oval shaped slot 202 are engaged by the ramps of cantilevered underside portions 32, 34 and engaged between head seal 14 and oval shaped base 28. Oval shaped base 28 is then perpendicular to oval slot 202. Head seal 14 flattens against secondary panel 200 to form a sealing relationship and locking tabs 40, 42 flex upwardly so as to traverse a width of oval shaped base 28 and lock fastener 10 in place. The user then linearly urges retainer 20, with secondary panel 200 attached, through an aperture in primary panel 100. A typical but non-limiting example of a primary panel 100 would be automotive door sheet metal. Retention fingers 52, 54 flex inwardly while passing through the aperture in primary panel 100 and, after clearing primary panel 100, snap outwardly to detent engage primary panel 100. It is envisioned that some applications may reverse the order of installation. Additionally, the user may insert a foam or rubber washer (not shown) onto head seal 14 or retainer seal 18 to enhance the sealing function. Subsequently, when the secondary panel 200 is to be removed, such as for servicing or replacement of an automotive door module, the user turns fastener 10 by one quarter turn (i.e., 90°) whereby fastener 10 releases from secondary panel 200 by remains attached to primary panel 100. This provides for fasteners 10 to remain in place in the primary panel 100 while any apparatus associated with secondary panel 200 is reloaded and subsequently refastened.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A fastener including:
   a head with an oval shaped cross section;
   a post supporting said head, wherein diametrically opposed cantilevered portions of said head defined by said oval shaped cross section extend outwardly from said post;
   a first seal supported by said post thereby defining a space between said seal and said cantilevered portions for engaging a first panel therebetween, wherein said first seal forms a sealing relationship with the first panel about an entire periphery of said first seal;
   a second seal supported by said post, separated from said first seal; and
   a cylindrical retainer including flexible elements for engaging a second panel between said flexible elements and said second seal, wherein said second seal forms a sealing relationship with the second panel about an entire periphery of said second seal.

2. The fastener of claim 1 wherein said diametrically opposed cantilevered portions include ramped undersides facing said first seal.

3. The fastener of claim 2 further including locking tabs formed at an intersection of said first seal and said post.

4. The fastener of claim 3 wherein said oval shaped cross section has a major axis and a minor axis, said post having a diameter formed along said minor axis and each of said cantilevered portions extending by a distance equal to one half of the difference between said major axis and said minor axis.

5. The fastener of claim 4 wherein said head is constructed and arranged to be inserted into a slot in a first panel with a width substantially equal to said minor axis and a length at least equal to said major axis, wherein during insertion said minor axis is aligned with a width of the slot, and wherein after insertion, the fastener is rotated whereby edges of the slot are engaged in said first space.

6. The fastener of claim 5 wherein said locking tabs are formed proximate to said minor axis.

7. The fastener of claim 5 wherein said cylindrical retainer is constructed and arranged to be linearly inserted into a circular aperture in a second panel whereby said flexible elements engage the second panel.

8. The fastener of claim 7 wherein said flexible elements are flexible fingers extending from cylindrical retainer toward said second seal.

9. The fastener of claim 8 wherein said flexible fingers have portions of different lengths thereby allowing a range of thicknesses of the second panel to be engaged between said flexible fingers and said second seal.

10. The fastener of claim 9 wherein said head includes a circular upper surface and an oval-shaped base and further includes frusto-conical walls formed between said circular upper surface and said oval-shaped base.

11. The fastener of claim 10 wherein said upper surface includes a first blind aperture for receiving a tool.

12. The fastener of claim 11 wherein said retainer is at least partially hollow and includes a second blind aperture for receiving a tool.

13. A fastener including:
   a head with an oval shaped cross section;
   a post supporting said head, wherein diametrically opposed cantilevered portions of said head defined by said oval shaped cross section extend outwardly from said post;
   a first seal supported by said post thereby defining a space between said seal and said cantilevered portions for engaging a first panel therebetween, wherein said first seal forms a sealing relationship with the first panel about an entire periphery of said first seal;
   a second seal supported by said post, separated from said first seal; and
   locking tabs formed at an intersection of said first seal and said post.

14. The fastener of claim 13 wherein said diametrically opposed cantilevered portions include ramped undersides facing said first seal.

15. The fastener of claim 14 wherein said oval shaped cross section has a major axis and a minor axis, said post having a diameter formed along said minor axis and each of said cantilevered portions extending by a distance equal to one half of the difference between said major axis and said minor axis.

16. The fastener of claim 15 wherein said head is constructed and arranged to be inserted into a slot in a first panel with a width substantially equal to said minor axis and a length at least equal to said major axis, wherein during insertion said minor axis is aligned with a width of the slot, and wherein after insertion, the fastener is rotated whereby edges of the slot are engaged in said first space.

17. The fastener of claim 16 wherein said locking tabs are formed proximate to said minor axis.

18. The fastener of claim 17 wherein said head includes a circular upper surface and an oval-shaped base and further includes frusto-conical walls formed between said circular upper surface and said oval-shaped base.

19. The fastener of claim 18 wherein said upper surface includes a first blind aperture for receiving a tool.

20. A fastener including:
- a head including a circular upper surface and an oval-shaped base with a major axis and a minor axis, and further including frusto-conical walls formed between said circular upper surface and said oval-shaped base;
- a post supporting said head, wherein diametrically opposed cantilevered portions of said head defined by said oval-shaped base extend outwardly from said post;
- a first rotationally symmetric umbrella-shaped seal supported by said post thereby defining a space between said seal and said cantilevered portions for engaging a first panel therebetween, wherein said first seal forms a sealing relationship with the first panel;
- a second rotationally symmetric umbrella-shaped seal supported by said post, separated from said first seal;
- locking tabs formed at an intersection of said first seal and said post, proximate to said minor axis;
- a cylindrical retainer including flexible fingers extending from cylindrical retainer toward said second seal for engaging a second panel between said flexible fingers and said second seal, said flexible fingers having portions of different lengths thereby allowing a range of thicknesses of the second panel to be engaged between said flexible fingers and said second seal, wherein said second seal forms a sealing relationship with the second panel;
- said diametrically opposed cantilevered portions including ramped undersides facing said first seal;
- said post having a diameter formed along said minor axis and each of said cantilevered portions extending by a distance equal to one half of the difference between said major axis and said minor axis;
- said head being constructed and arranged to be inserted into a slot in a first panel with a width substantially equal to said minor axis and a length at least equal to said major axis, wherein during insertion said minor axis is aligned with a width of the slot, and wherein after insertion, the fastener is rotated whereby edges of the slot are engaged in said first space and said cylindrical retainer being constructed and arranged to be linearly inserted into a circular aperture in a second panel whereby said flexible elements engage the second panel;
- said upper surface including a first blind aperture for receiving a tool and said retainer being at least partially hollow and including a second blind aperture for receiving a tool; and
- wherein said fastener is formed from a single integrally molded piece.

* * * * *